(No Model.)
L. HAAS.
MEAT AND VEGETABLE CHOPPER.
No. 266,030. Patented Oct. 17, 1882.
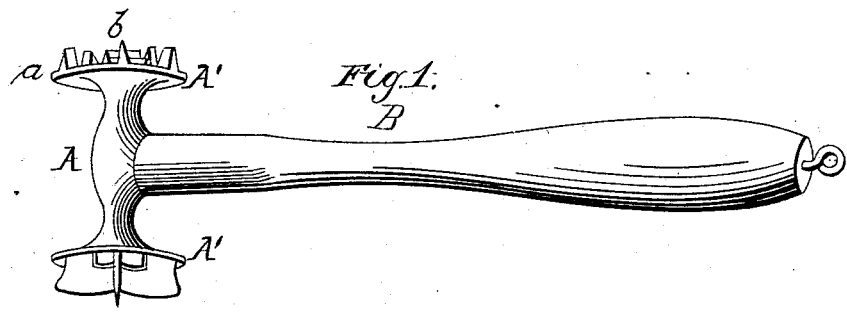
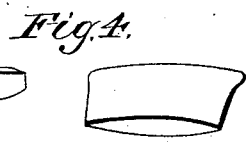
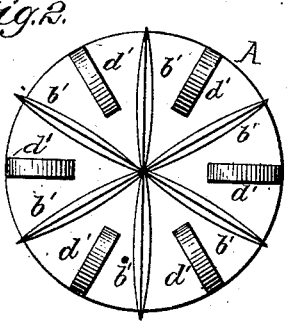
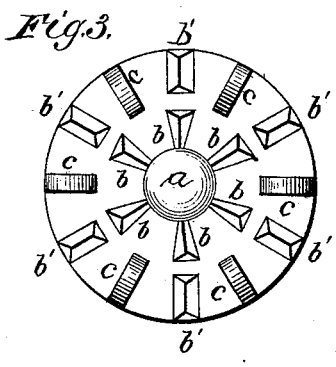
Witnesses
Chas. F. Edmondson
Jas. H. Baxter
Inventor
Levi Haas
By Myers &
Attorneys

UNITED STATES PATENT OFFICE.

LEVI HAAS, OF CHESTER, PENNSYLVANIA.

MEAT AND VEGETABLE CHOPPER.

SPECIFICATION forming part of Letters Patent No. 266,030, dated October 17, 1882.

Application filed June 27, 1882. (No model.)

*To all whom it may concern:*

Be it known that I, LEVI HAAS, a citizen of the United States, residing at Chester, in the county of Delaware and State of Pennsylvania, have invented certain new and useful Improvements in Meat and Vegetable Choppers; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to an improved instrument for chopping and mangling meats and vegetables more particularly—as, for instance, in making "mince-meat"—it being equally applicable to soften or tender steaks; and it consists of an approximately hammer-shaped device with one or more circular or approximately circular shaped disks—as a hexagonal, octagonal, or similar shape—said disk or head having knives or teeth and blunt projections or studs of less length than the teeth or knives, substantially as hereinafter more fully set forth.

In the accompanying drawings, Figure 1 is a side view of my improved meat and vegetable chopper. Figs. 2 and 3 are plan or face views of the two heads of the same; and Figs. 4 and 5 are detailed views of the knives, teeth, and blunt projections or studs thereof.

In carrying out my invention I make use of a piece of metal, A, similar to the shank of a hammer, at each end of which is a disk, or head, A', of circular or an approximate circular shape—as hexagonal, octagonal, or a similar shape—the purpose of which will be explained presently. The shank A is provided with an eye or central aperture through it to receive and permit the attachment thereto of a handle, B. The disks or heads A' are provided, one with a central round-faced stud, $a$, and two series of radial teeth, $b$ $b'$, the inner series radiating from the stud $a$ and suitably spaced apart, one from the other, while the outer or marginal series is arranged in a line with but spaced apart from the inner series of teeth. The inner series tapers toward the central stud by preference. The same disk is also provided with a marginal series of blunt projections or studs, $c$, alternating with the outer teeth, but of less length or height than the teeth, as is also the stud $a$. The projections $c$ are made convex on their faces or beating-surfaces. The purpose of this arrangement as to height of the teeth and the studs is to enable the studs or projections to strike the meat, vegetables, or other substance operated on subsequently to the action of the teeth, whereby they will tend to free or release the meat or other substance from the teeth, and thus avoid such annoyance or difficulty. The effect of the short projections or studs is the same as that of springs placed upon the teeth, as has heretofore been practiced to a certain extent to secure that end, said studs or projections producing a concussion or jarring action upon the meat to liberate it from the teeth. The object of the circular or extended surface of the heads, in connection with the arrangement of the teeth and projections radially thereon to the central stud, is to cause the substance or meat acted on to spread outward toward the circumference of the head by reason of the spaces between the radial series of teeth and projections radiating or extending from a solid center stud outwardly. The opposite head or disk varies in its equipage, in that it is provided with a series of radial knives, $d'$, having convexed cutting-edges, and jointly equal in length to the entire diameter of the head; or extending completely across its face $d'$ is a series of similar convexed projections or studs as those of the former head or disk, which alternate with and are less in height than the latter, to serve the same purpose as that ascribed to the analogous arrangement of the teeth and projections on the other head.

This chopper or implement is capable of being cheaply manufactured, springs or other attachments being dispensed with, while it is simple and performs its work with equal facility as those of other construction, without liability to get out of order or to require the renewal of appendages, as would be the case were springs used.

I claim and desire to secure by Letters Patent—

1. In a meat or other chopper or implement, the shank having a circular, hexagonal, octagonal, or other similar shaped head, said head provided with central round-faced stud and series of alternating teeth and projections, substantially as and for the purpose set forth.

2. In a meat or other chopper, the shank having a handle, and circular heads or disks armed with alternating series of teeth and projections, and rounded or convexed studs of less height than the teeth or knives, substantially as and for the purpose specified.

In testimony whereof I affix my signature in presence of two witnesses.

LEVI HAAS.

Witnesses:
 GEO. B. LINDSAY,
 H. L. DONALDSON.